US010811033B2

(12) United States Patent
Cordourier Maruri et al.

(10) Patent No.: US 10,811,033 B2
(45) Date of Patent: Oct. 20, 2020

(54) VIBRATION SENSOR SIGNAL TRANSFORMATION BASED ON SMOOTH AVERAGE SPECTRUMS

(71) Applicant: Intel Corporation, Santa Clara, CA (US)

(72) Inventors: Hector Alfonso Cordourier Maruri, Guadalajara (MX); Jonathan Huang, Pleasanton, CA (US); Paulo Lopez Meyer, Zapopan (MX); Julio Cesar Zamora Esquivel, Zapopan (MX); Jose Rodrigo Camacho Perez, Guadalajara Jalisco (MX)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 16/017,501

(22) Filed: Jun. 25, 2018

(65) Prior Publication Data

US 2019/0043524 A1 Feb. 7, 2019

Related U.S. Application Data

(60) Provisional application No. 62/629,700, filed on Feb. 13, 2018, provisional application No. 62/630,745, filed on Feb. 14, 2018.

(51) Int. Cl.
*G10L 25/30* (2013.01)
*G10L 25/18* (2013.01)
(Continued)

(52) U.S. Cl.
CPC ............ *G10L 25/30* (2013.01); *G02B 27/017* (2013.01); *G10L 21/0216* (2013.01);
(Continued)

(58) Field of Classification Search
CPC ....................................................... G10L 25/30
(Continued)

(56) References Cited

U.S. PATENT DOCUMENTS

| 4,520,238 A | 5/1985 | Ikeda |
| 7,209,567 B1 * | 4/2007 | Kozel ............... H04R 3/007 381/94.3 |

(Continued)

FOREIGN PATENT DOCUMENTS

| CN | 101742387 B | 1/2013 |
| CN | 105321528 A | 2/2016 |

(Continued)

OTHER PUBLICATIONS

US 9,439,001 B2, 09/2016, Liu et al. (withdrawn)
(Continued)

*Primary Examiner* — Susan I McFadden
(74) *Attorney, Agent, or Firm* — Schwabe, Williamson & Wyatt, P.C.

(57) ABSTRACT

Apparatuses and methods for transforming a signal from a vibration sensor into an approximation of a signal from a microphone are disclosed. The vibration sensor signal may be transformed by first obtaining a smooth average spectrum and corresponding deviation data for the vibration sensor signal. The smooth average spectrum may be passed through a mapping neural network to obtain a transformed smooth average spectrum that approximates a smooth average spectrum that would be obtained from a microphone. The transformed signal is then obtained by recombining the transformed smooth average spectrum with the deviation data.

19 Claims, 7 Drawing Sheets

(51) Int. Cl.
*G10L 25/21* (2013.01)
*H04R 25/00* (2006.01)
*G02B 27/01* (2006.01)
*G10L 21/0216* (2013.01)
*H04R 1/46* (2006.01)
*H04R 3/00* (2006.01)
*H04R 5/027* (2006.01)
*G10L 15/00* (2013.01)

(52) U.S. Cl.
CPC .............. *G10L 25/18* (2013.01); *G10L 25/21* (2013.01); *H04R 1/46* (2013.01); *H04R 3/005* (2013.01); *H04R 5/027* (2013.01); *H04R 25/507* (2013.01); *G10L 15/00* (2013.01); *H04R 2410/05* (2013.01)

(58) Field of Classification Search
USPC ......................................................... 704/202
See application file for complete search history.

(56) References Cited

U.S. PATENT DOCUMENTS

| | | | |
|---|---|---|---|
| 7,580,540 B2 | 8/2009 | Zurek et al. | |
| 8,521,254 B2 * | 8/2013 | Doerr | G01R 33/288 600/407 |
| 9,071,900 B2 | 6/2015 | Vesa et al. | |
| 9,130,651 B2 * | 9/2015 | Tabe | H04B 1/3838 |
| 9,135,915 B1 | 9/2015 | Johnson et al. | |
| 9,225,306 B2 | 12/2015 | Park et al. | |
| 9,503,800 B2 | 11/2016 | Song et al. | |
| 9,721,111 B2 * | 8/2017 | Cavanaugh | G06F 21/62 |
| 10,298,282 B2 * | 5/2019 | Camacho Perez | H04W 4/70 |
| 10,348,355 B2 * | 7/2019 | Camacho Perez | H04B 1/40 |
| 10,417,554 B2 * | 9/2019 | Scheffler | G06N 3/04 |
| 10,551,830 B2 * | 2/2020 | Bense | G07C 3/00 |
| 2016/0118035 A1 | 4/2016 | Hyde et al. | |
| 2016/0134984 A1 | 5/2016 | Erkelens | |
| 2017/0111747 A1 | 4/2017 | van Halteren et al. | |

FOREIGN PATENT DOCUMENTS

| | | |
|---|---|---|
| CN | 106257584 A | 12/2016 |
| WO | WO2016077557 A | 5/2016 |

OTHER PUBLICATIONS

Nirupam Roy et al., "Listening through a Vibration Motor", Jun. 16-30, 2016, 14 pages, University of Illinois at Urbana-Champaign.

* cited by examiner

VIBRATION SENSOR SIGNAL TRANSFORMATION BASED ON SMOOTH AVERAGE SPECTRUMS

CROSS-REFERENCE TO RELATED APPLICATIONS

This application claims priority to U.S. Provisional Application No. 62/629,700, filed on 13 Feb. 2018, and U.S. Provisional application No. 62/630,745 filed on Feb. 14, 2018, the disclosures of which are incorporated herein in their entireties and for all purposes.

TECHNICAL FIELD

Embodiments of the present disclosure generally relate to the fields of speech recognition and wearable devices, and more particularly, to wearable devices configured to sense vibrations and transform a signal from a vibration sensor into an approximation of the signal if obtained by a microphone.

BACKGROUND

Audio sensors, such as microphones, have been employed to capture a device user's voice through air propagation for automatic speech recognition (ASR), among other uses. Portable or wearable electronic devices (hereinafter simply, wearable devices), including head wearable devices, continue to increase in popularity, and feature increasingly sophisticated functionality. Wearable devices may include one or more audio sensors to receive voice input for a variety of functions, such as human-to-human communication, voice command control, or interacting with a virtual assistant. Various functions may require accurate input from an ASR routine. The accuracy of an ASR routine may depend upon the type and quality of input from a given wearable device's audio sensors.

Wearable devices may be equipped with multiple audio sensors of varying types, including the aforementioned microphones, as well as vibration sensors. Vibration sensors may include nasal bridge pickups that use piezoelectric sensors to detect vibrations in a user's head generated while the user speaks, as well as feedback from vibration motors (such as may be found in many devices to provide haptic feedback) that may be actuated by speech vibrations. The characteristics and quality of signal received from an audio sensor may depend upon the type of sensor.

DESCRIPTION OF EMBODIMENTS

The audio characteristics of a signal may depend upon the nature of the device used to acquire the signal. For example, a vibration sensor, such as may be used to implement a nasal bridge pickup in a wearable, may yield an audio signal that emphasizes nasal phonemes compared to a similar signal from a microphone; this phenomenon can be called "nasal distortion". This nasal distortion may be significant enough to adversely affect the word error rate (WER) of automatic speech recognition (ASR) algorithms that are designed around a signal obtained from a microphone. Although a microphone may supply a signal that is closer in match to actual speech and so allows an ASR routine to achieve an acceptably low WER, microphones also suffer from comparatively low rejection of surrounding sound. Thus, when a device with a microphone is used in a noisy environment, such as a factory or near traffic, the signal-to-noise ratio (SNR) may be too low to allow the ASR algorithms to accurately extract speech components, and result in an unacceptably high WER. In comparison, a vibration sensor, as it may rely upon directly picking up vibrations through a user's skull bone, may offer a signal with a substantially better SNR in noisy environments, albeit subject to nasal distortion.

It will be recognized that in relatively quiet scenarios, a microphone pickup may be preferable to use with ASR routines, due to its relative lack of distortion. However, in noisy environments, a vibration sensor pickup may be preferred (or even necessary in sufficiently noisy environments) due to its comparatively high SNR, but will nevertheless result in a degraded WER that some users may consider unacceptable. A solution to this problem is to transform the signal from a vibration sensor pickup to substantially remove the nasal distortion components, thereby approximating the signal that might be obtained were the signal obtained from a microphone in a relatively quiet environment.

The embodiments disclosed herein convert a signal from a vibration sensor into an approximation of a signal that might be obtained from a microphone using a neural network to calculate the approximation. As will be described herein, the neural network may be trained using sample vibration sensor signals as inputs and corresponding microphone signals as targets. More specifically, the vibration sensor signal is first converted into a smooth average spectrum and corresponding deviation data. The smooth average spectrum may then be passed through the neural network to obtain a transformed smooth average spectrum, where the transformed smooth average spectrum approximates a smooth average spectrum that might be obtained if the signal were from a microphone. The corresponding deviation data from the vibration sensor signal is then added back to the transformed smooth average spectrum. The combined transformed smooth average spectrum and original deviation data is then converted back into an audio signal, which now may approximate a microphone signal.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
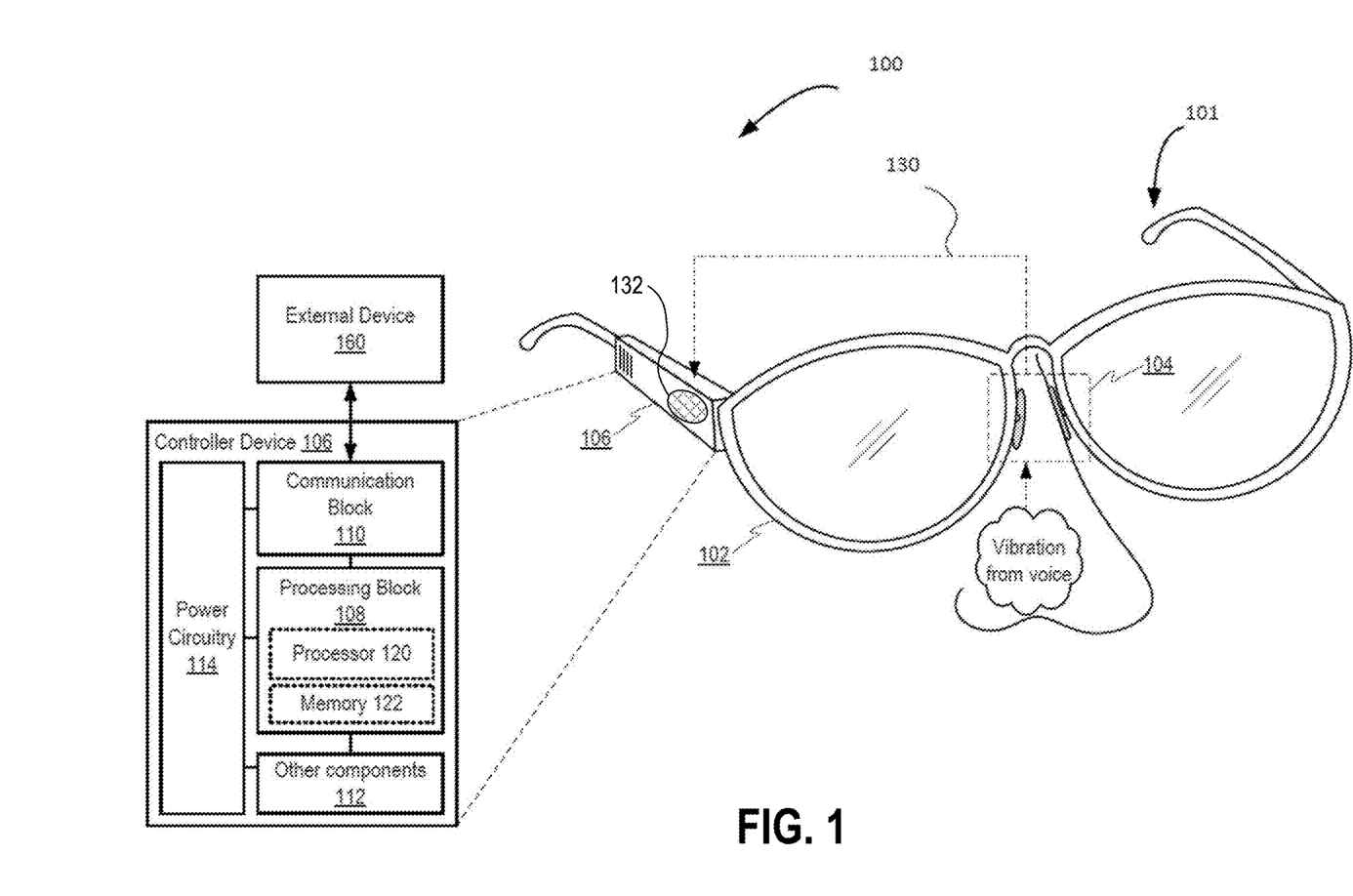
FIG. 1 is a diagram illustrating an example apparatus for transformation of a vibration-indicative signal generated in response to a user's voice into an emulated audio signal, in accordance with some embodiments.

FIG. 1 is a diagram illustrating an example apparatus for transformation of a signal generated by a vibration sensor pickup in response to vibration induced by a user's voice in a portion of a user's head into an audio signal that approximates the signal that would be obtained if a microphone pickup were used, in accordance with some embodiments. The apparatus 100 may comprise a wearable device, to be worn on or around a user's head. The audio signal may be provided by vibration sensors disposed in the apparatus 100, in response to vibrations caused by the user's voice in the user's head bones (e.g., nasal bones). This vibration signal, if used in speech recognition or direct voice reproduction, may not always represent the user's voice with desired quality, and where used with an ASR routine, may result in an unacceptably high WER. The apparatus 100 may be configured to transform the vibration sensor signal into an audio signal that emulates a microphone signal, which may be used for reproduction of the user's voice or further processing by an ASR system to achieve an acceptable WER.

Example implementations of the apparatus 100 may include eyeglasses, helmets, headsets, diadems, caps, hats, or other types of headwear. While examples of specific implementations (e.g., in eyeglasses) and/or technologies (e.g., piezoelectric sensors, wireless communications, etc.) may be employed herein, these examples are presented merely to provide a readily comprehensible perspective from which the more generalized devices, methods, etc. described herein may be understood.

As noted above, the apparatus 100 may comprise a wearable device, such as eyeglasses 101, in the example illustrated in FIG. 1. The apparatus 100 may include a frame 102 of eyeglasses 101. The frame 102 is described herein as a part of the apparatus 100 (in this example, eyeglasses 101) for the sake of explanation. Other applications or configurations of an apparatus 100 may result in implementations that remain consistent with the teachings presented herein.

One or more sensors 104 and 132 for picking up an audio signal may be disposed on the apparatus 100, such as on the frame 102, as shown in FIG. 1. For ease of explanation, the term "sensor" is used herein to describe at least one sensor, e.g., one, two, or more sensors that may be disposed on the apparatus 100. The sensors 104 and 132 may be mounted on the frame 102 via mechanical attachment (e.g., screw, nail or other fastener), adhesive attachment (e.g., a glue, epoxy, etc.) or may be incorporated within the structure of the frame 102. In embodiments, the sensor 104 may comprise vibration sensing circuitry. The sensing circuitry may comprise, for example, piezoelectric components such as a diaphragm or other piezoelectric transducer, to convert vibration (e.g., mechanical pressure waves) occurring in portions of the user's head into signals. In some embodiments, the sensing circuitry may comprise any type of sensors responsive to vibration, such as, for example, microelectromechanical systems (MEMS) accelerometer or the like. In still other embodiments, the sensing circuitry may comprise a vibration motor of a mobile device which may be configured to also/alternatively act as a vibration-sensitive pickup.

Similarly, sensor 132 may comprise a microphone. The microphone may comprise a condenser, dynamic, diaphragm, ribbon, or any other technology or type suitable for implementing a microphone pickup. While FIG. 1 depicts a single sensor 132, embodiments of apparatus 100 may include a plurality of sensors 132. For example, some embodiments of apparatus 100 may include a sensor 132 on each side of frame 102, so as to provide a stereoscopic pick-up. Other embodiments may implement sensor 132 as an array of sensors, so as to provide better directional pick up of audio by way of beam forming or shaping, or to employ noise cancellation and/or reduction of background noise in subsequent processing. Sensor 132 may be placed in other locations on apparatus 100 that are suitable to picking up desired audio, such as the voice of a user of apparatus 100. Still other embodiments may place sensor 132 separate from apparatus 100, e.g. an external microphone such as may be found on a pair of headphones or Bluetooth headset, lapel microphone, or other suitable placement.

As shown, the sensor 104 may be disposed on the frame 102 to be in contact with, or at least proximate to, the nose of a user wearing the apparatus 100. The bridge of the user's nose may resonate in response to the user's voice. The sensor 104 may be able to detect vibration caused by the nasal bones resonating with the user's voice, and may convert the sensed vibration into a signal 130, e.g., an electronic signal, to be processed as described below.

The embodiments of this disclosure are not limited to nasal vibration detection described above and are described herein for ease of understanding. Other types of vibration indicative of the user's voice may be sensed in different portions of the user's head, such as, for example, temples, forehead, or other portions of the user's head, for example, in the upper portion of the user's head.

The apparatus 100 may further include a controller device 106, which in some embodiments may also be disposed on the apparatus 100 (e.g., the frame 102) as shown. The controller device 106 may be electrically and/or communicatively coupled with sensors 104 and 132, so as to receive a signal from sensor 132 (shown as directly attached to controller device 106) and receive and process the signal 130 provided by the sensor 104. Controller device 106 may use the signal from sensor 132 to aid in transforming the signal 130 from sensor 104 into an emulated audio signal that approximates the signal obtained from sensor 132, with distortions associated with the vibration in the user's head portion that may be manifested in the generated sensor signal at least partially mitigated. The use of the signal from sensor 132 in aiding in transforming signal 130 will be discussed in greater detail herein.

The controller device 106 may comprise, for example, a processing block 108, to process the signal 130 and generate an emulated audio signal, and communication block 110 to transmit the signal to an external device 160 for further processing, e.g., using a speech recognition technique, such as ASR. The processing block 108 may comprise at least a processor 120 and memory 122. The processing block 108 may include components configured to record and process the readings of the signal 130. The processing block 108 may provide these components through, for example, a plurality of machine-readable instructions stored in the memory 122 and executable on the processor 120. The controller device 106 may record the signal 130 and store (e.g., buffer) the recorded readings, for example, in the memory 122, for further analysis and processing, e.g., in real time or near-real time.

The processor 120 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA), which may be customized to transform signal 130 to approximate a microphone signal, or may employ discrete circuitry, including discrete logic circuits.

Examples of support circuitry may include host side or input/output (I/O) side chipsets (also known as northbridge and southbridge chipsets/components, in Intel® architectures) to provide an interface through which the processor 120 may interact with other system components that may be operating at different speeds, on different buses, etc. in device 106. Some or all of the functionality commonly associated with the support circuitry may also be included in the same physical package as the processor.

The memory 122 may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on basic input/output system (BIOS), Unified Extensible Firmware Interface (UEFI), etc. to provide instructions when device 106 is activated, programmable memories such as electronic programmable ROMs (erasable programmable read-only memory), Flash, etc. Other fixed/removable memory may include, but is not limited to, electronic memories such as solid state flash memory, removable memory cards or sticks, etc.

The communication block 110 may be communicatively coupled with external device 160 and may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 110 may operate in accordance with one or more applicable standards in any version. To this end, the communication block 110 may include, for instance, hardware, circuits, software, or any combination thereof that allows communication with external computer systems.

In some specific non-limiting examples, the communication block 110 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the communication block 110 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

The apparatus 100 may further include a power circuitry block 114 configured to provide power supply to the components of the controller device 106. In some embodiments, the power circuitry block 114 may be configured to power on the controller device 106 continuously or periodically, in order to save battery power. In some embodiments, the power circuitry block 114 may be configured to power on the controller device 106 on a "wake-up" basis, e.g., in response to vibration detection by the sensor 104. The power circuitry block 114 may include internal power sources (e.g., battery, fuel cell, etc.) and/or external power sources (e.g., power grid, electromechanical or solar generator, external fuel cell, etc.) and related circuitry configured to supply device 106 with the power needed to operate.

The controller device 106 may include other components 112 that may be necessary for functioning of the apparatus 100. Other components 112 may include, for example, hardware and/or software to allow users to interact with the controller device 106 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in other components 112 may be incorporated within the controller device 106 and/or may be external to the device 106 and coupled to device 106 via a wired or wireless communication medium.

Figure 2:
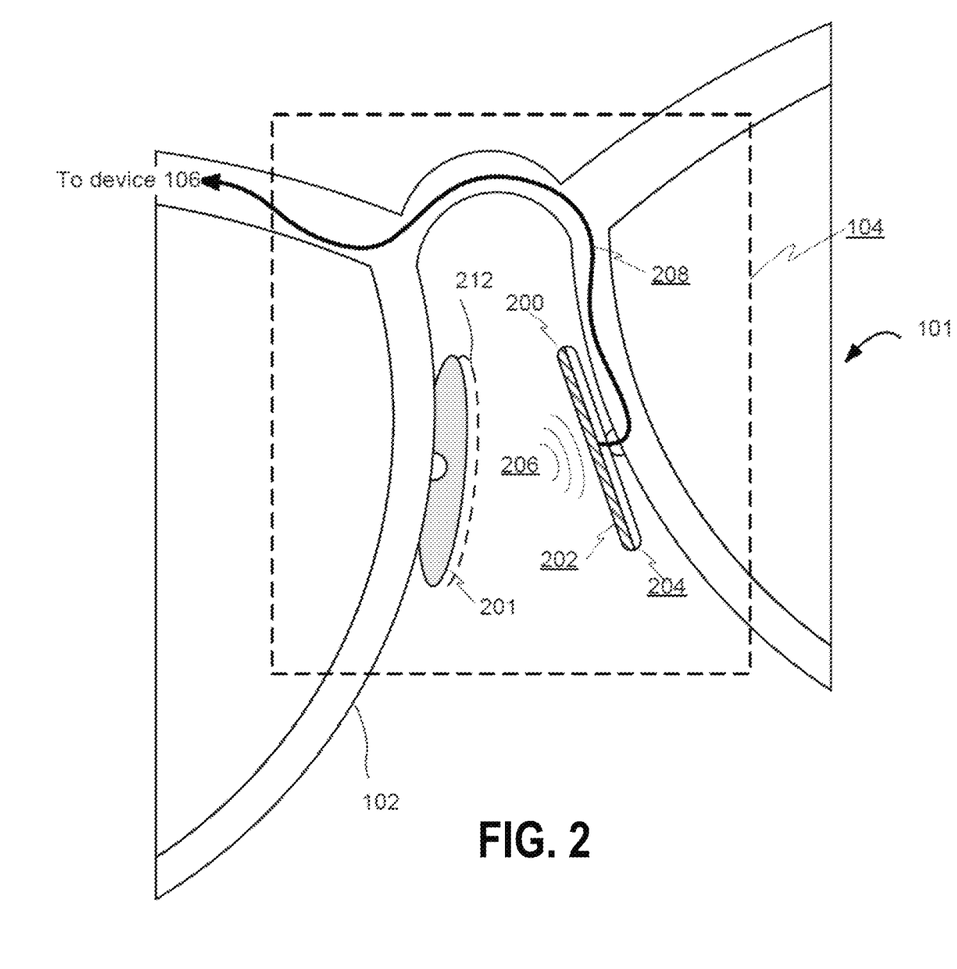
FIG. 2 illustrates an example configuration of the apparatus of FIG. 1, in accordance with some embodiments.

FIG. 2 illustrates an example configuration of the apparatus of FIG. 1, in accordance with some embodiments.

More specifically, FIG. 2 illustrates an example disposition of the sensing circuitry in the frame 102 of the apparatus 100. For ease of understanding, like elements of FIGS. 1 and 2 are indicated by like numerals. As shown, the sensor 104 may be disposed within a nosepiece 200 of the frame 102. The sensor 104 may comprise, for example, sensing circuitry (e.g., piezoelectric transducer) 202 affixed or removably attached to structural support 204 of the nosepiece 200 of the frame 102. The sensing circuitry 202 may include, for example, a piezoelectric diaphragm to convert vibration 206 into a signal. Vibration 206 may occur due to the user's nasal bones (not shown) that may resonate in response to the user's voice. The piezoelectric diaphragm comprising the sensing circuitry 202 may be able to accurately generate a signal indicative of the nasal bones' vibration caused by the user's voice and may not require external power, because the pressure waves may compress a piezoelectric crystal of the diaphragm to generate the electronic signal.

The eyeglasses 101 may further include a wire 208 to convey the signal from the sensor 104 to the controller device 106. The wire 208 is shown for illustration purposes; the use of wireless communication may also be possible to transmit the signal to the controller device 106. Similarly, microphone sensor 132 may communicate with controller device 106 either wirelessly or via a wire.

A variety of sensor configurations may be implemented consistent with the present disclosure. For example, given that two nosepieces 200 and 201 may exist in a common pair of glasses, at least one of the two nosepieces 200, 201 may include the sensor 104. In another example implementation, both nosepieces 200 and 201 may include sensing circuitries 202 and 212 (shown in dashed lines), comprising the sensor 104. For example, the circuitries 202 and 212 disposed in each nosepiece 200 may be wired in series to generate stronger signals. In another embodiment, the circuitries 202, 212 in the nosepieces 200, 201 may be wired individually, and the controller device 106 (e.g., processing block 108) may select the sensor circuitry 202 or 212 of the sensor 104 to employ based on the strength of the electronic signals received from each sensor circuitry. In this manner, the apparatus 100 may be able to account for the particularities in each user's nasal bones (e.g., breaks, natural deformities such as a deviated septum, etc.) and select the particular sensor circuitry that may provide the strongest and cleanest signal.

In some embodiments, the apparatus may comprise a wearable device other than eyeglasses, for example a hat, a headset, a helmet, or other type of headwear. The vibration sensor (or sensors) may be disposed in different areas of the wearable device, in order to sense vibration of the user's head bones in response to the user's voice. In general, the sensors may be disposed such as to provide a contact (e.g., direct contact or proximity contact) between the sensors and an upper portion of the user's head in response to application of the wearable device to the user's head. For example, the sensors may be disposed in a head-fitting area of a respective wearable device in order to provide the contact between the sensors and the temples or forehead of the user, to conduct sensing of the respective bone vibration in response to the user's voice. In general, any headwear or form factors that may provide for contact of a sensor with an upper portion of the user's head may be used with embodiments described herein.

Figure 3:
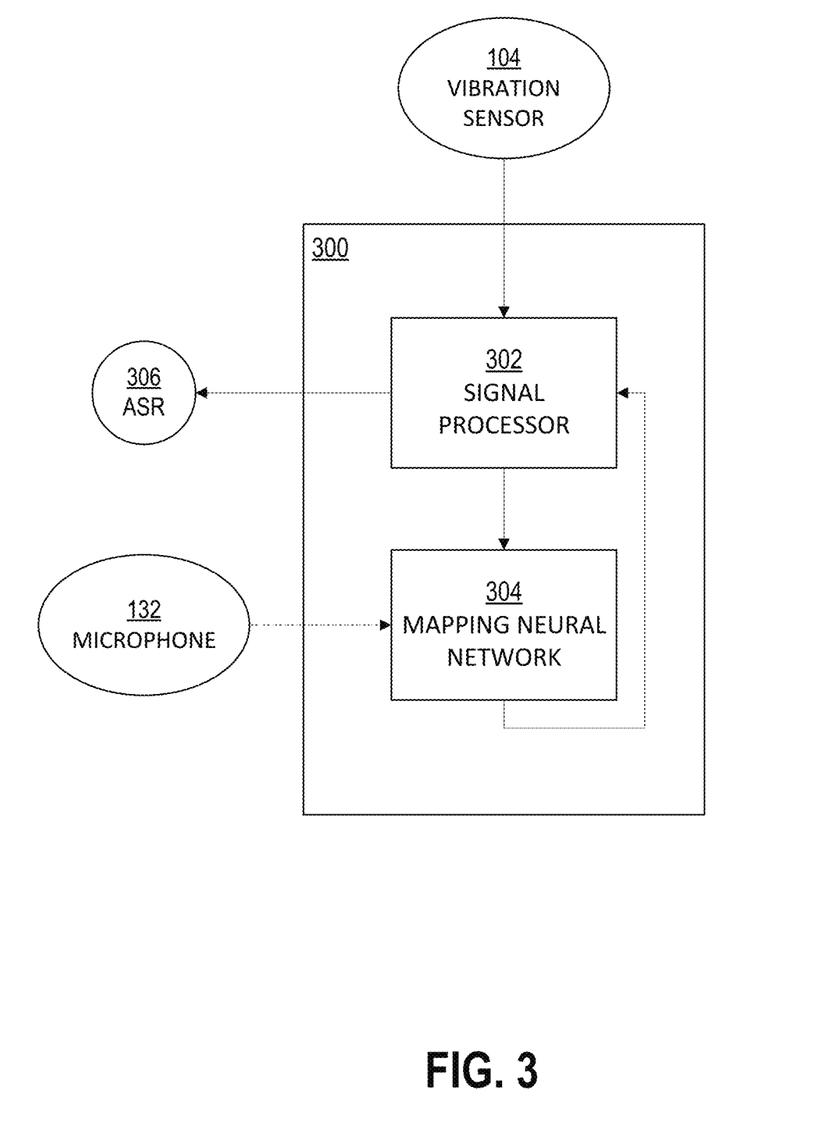
FIG. 3 illustrates possible components that may comprise at least a portion of an apparatus to transform a signal from a vibration sensor into an approximation of a signal from a microphone, according to some embodiments.

Referring to FIG. 3, an apparatus 300 may include a signal processor 302 and a mapping neural network 304. Signal processor 302 may split, into one or more blocks, the signal 130 captured with a vibration sensor and derive a smooth average spectrum (SAS) and corresponding deviation data from each block. Signal processor 302 may then pass each block's smooth average spectrum through the mapping neural network 304 to obtain a transformed smooth average spectrum (tSAS) for each block. Mapping neural network 304 may transform the smooth average spectrum of the signal 130 into a transformed smooth average spectrum that approximates the smooth average spectrum that would be obtained if the signal were captured with a microphone 132. Signal processor 302 may then combine each transformed smooth average spectrum with the block's corresponding deviation data, and recombine all blocks to obtain a transformed signal. The transformed signal may then be communicated to, for example, an ASR module 306, provided for person to person communications such as via voice communications (e.g. a phone call or VoIP session), or otherwise supplied for further use.

In some embodiments, apparatus 300 may be implemented as a standalone device, or, in other embodiments, may be a part of apparatus 100, as a part of controller 106. In still other embodiments, apparatus 300 may be a part of processing block 108. Depending on the embodiment, apparatus 300 may be implemented using one or more computer readable medium/media (CRM), which may execute upon a processor such as found in controller 106, for example. Embodiments may implement apparatus 300 using one or more discrete components, application-specific integrated circuits (ASICs), field-programmable gate arrays (FPGAs), or any other suitable technology now known or later developed.

The mapping neural network 304 may be any suitable neural network that can be configured and trained to perform transformations of a SAS into a tSAS. In embodiments, the mapping neural network may be a feed-forward network of a sigmoid configuration. Some embodiments employ a mapping neural network with approximately 260 nodes, which may achieve results sufficient to enable real-time processing and transformation of SAS. In at least one embodiment, the mapping neural network 304 comprises a feed forward neural network (NN) with one input layer of 257 neurons, 2 hidden layers of 270 neurons with a rectified linear unit (ReLU) activation function, and one output layer of 257 neurons with a linear activation function. Other embodiments may employ different network topologies and/or different numbers of nodes. These parameters may impact upon the overall performance of the mapping neural network, and may be selected with respect to a given hardware platform running or hosting the mapping neural network, along with other considerations, such as a target or desired performance level, intended use of the transformed audio signal, and quality of the signal obtained from the microphone and vibration sensor pickups, to name a few examples.

Figure 4:
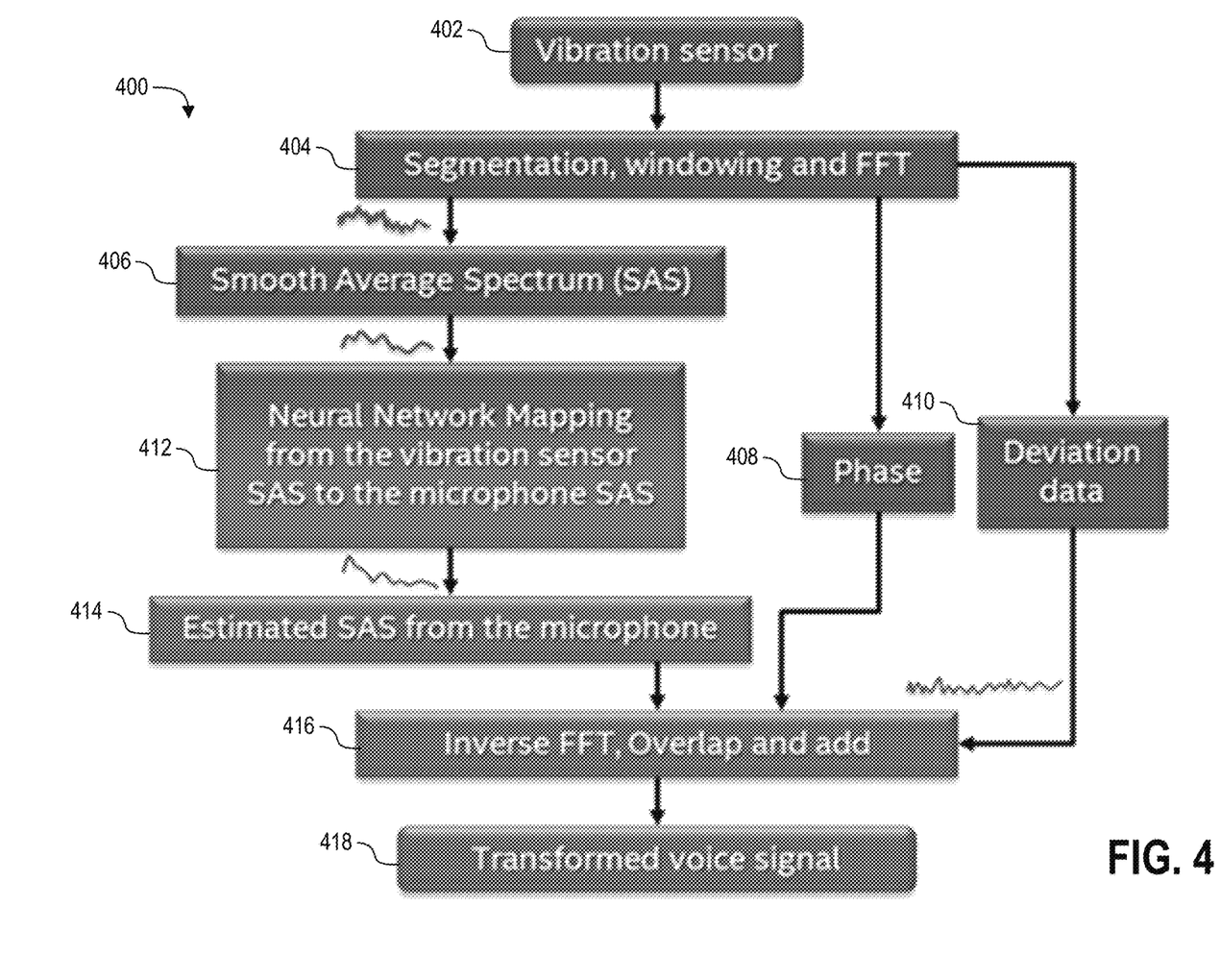
FIG. 4 illustrates a flow diagram of a process for transforming a signal from a vibration sensor into an approximation of a signal from a microphone using a smooth average spectrum, according to some embodiments.

The process flow that embodiments of apparatus 300, and more particularly signal processor 302, may take during runtime is depicted in FIG. 4. Process flow 400 may be executed by signal processor 302 and/or some other portion of apparatus 300 in whole or in part. A vibration sensor signal 402 may be obtained and provided for segmentation, windowing, and discrete or fast Fourier transformation (FFT) in operation 404. For each segment of signal 402, a smooth average spectrum may be obtained in operation 406, optional phase data in operation 408, and ripple deviation data (hereinafter, just "deviation") in operation 410. The smooth average spectrum from operation 406 may be passed to the mapping neural network 304 in operation 412, which in turn may provide a transformed smooth average spectrum in operation 414, which may approximate a smooth average spectrum if the signal 402 were obtained from microphone 132. In operation 416, the tSAS from operation 414 may be added back to the phase data (if used) from operation 408 and deviation data from operation 410, and then passed through an inverse FFT. The segments of the now-transformed signal may be reconnected, to yield a transformed voice signal in operation 418 that approximates the signal that would be obtained if the vibration sensor signal 402 had been captured using microphone 132.

Figure 5:
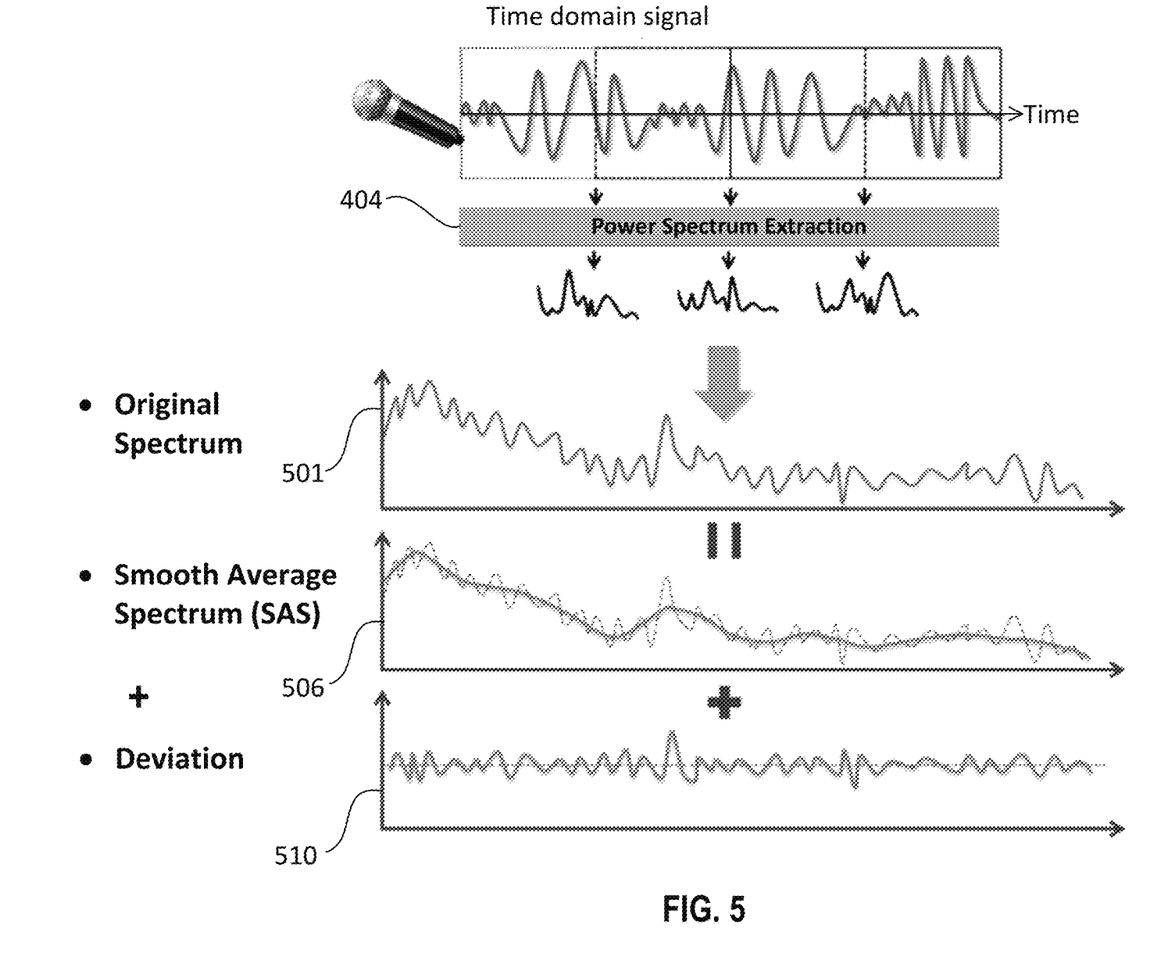
FIG. 5 illustrates the various components that are extracted from an audio signal as part of transforming a signal from a vibration sensor into an approximation of a signal from a microphone using a smooth average spectrum, according to some embodiments.

Operation 404 entails processing the vibration sensor signal 402 into components to obtain the SAS, phase data, and deviation data. FIG. 5 visually depicts the process and components obtained from the various segments of an audio signal in operation 404: the original spectrum 501, which can be decomposed into at least a smooth average spectrum 506 and deviation data 510. The smooth average spectrum 506 may be obtained from the vibration sensor signal 402 by smoothing a power spectrum computed from the vibration sensor signal 402. For example, the smooth average spectrum 506 may be calculated using a moving average on the original logarithmic spectrum (in dB), which will be described in greater detail below. In some embodiments, phase data may also be obtained; however, the use of phase data is not necessary to process flow 400. It should be understood that the process depicted in FIG. 5 may be applied to signals from both the vibration sensor 104, as well as signals from microphone sensor 132, which may be employed when training the mapping neural network 304.

For a given sensor, an original spectrum 501 is comprised of samples taken during the analog to digital conversion process performed on the raw analog signal from each sensor. The process of sampling and analog to digital conversion is well known to a person skilled in the relevant art. The parameters used for sampling signals (e.g. sampling frequency and quantization) from sensors 104 and 132 may be selected depending upon the intended use of the signals. For voice purposes such as ASR, sampling parameters suitable for capturing the normal human voice range may be employed, such as 16 kHz sampling frequency at an eight-bit resolution.

Once the signal from the sensor is obtained and sampled into a digital format, it may be segmented into blocks, with each block possibly overlapping adjacent blocks to some degree. Each block may be defined by a number of samples. The choice of block size may depend upon factors including, for example, the processing capabilities of the hardware, the intended use of the signal, the sampling rate, and whether and to what extent latency due to signal processing is tolerable. For a given sample rate, longer block sizes may introduce greater latency. In some embodiments, the block size may be selected to keep latency at a negligible level while allowing real-time processing. For example, some particular embodiments may use a block size of 512 samples at a 16 kHz sample rate. The blocks may overlap for some number of samples to help provide a smooth and continuous signal transformation, and allow signal reconstruction with an overlap-and-add routine. For example, in some embodiments each block may have an overlap of 75%.

The smooth average spectrum 506 may be derived for each of the blocks, as follows. Following segmentation, each block may be passed through a FFT/DFT routine, which allows phase data and a power spectrum to be computed for each block. The power spectrum may be transformed into logarithmic scale, to improve the representation of all spectrum elements. The SAS 506 may then be computed from the power spectrum by using a technique such as a simple moving average, where samples are averaged within a moving smoothing window, the smoothing window itself defined by a number of samples. The size, in number of samples, of the smoothing window may be selected with regard to desired ultimate transformation accuracy and computational requirements. A smaller smoothing window (fewer samples) may result in a SAS 506 that closely approximates the details of the power spectrum. This close approximation may yield a highly accurate transformation, but may be computationally intensive. Conversely, a larger window may the computationally less taxing (and so allow voice transformation on less capable hardware), but at the expense of smoothing over a greater amount of detail, resulting in a less accurate transformation. Beyond a desired accuracy, the window size may be selected based upon the impact of accuracy on a chosen ASR routine, where the transformed signal is to be used for ASR, as well as the capabilities of the hardware handling the transformation. The result from the simply moving average process is SAS 506. The deviation data 510 may be determined by subtracting the SAS 506 from the power spectrum obtained from the FFT; such subtraction may be done on a per-block basis.

Figure 6:
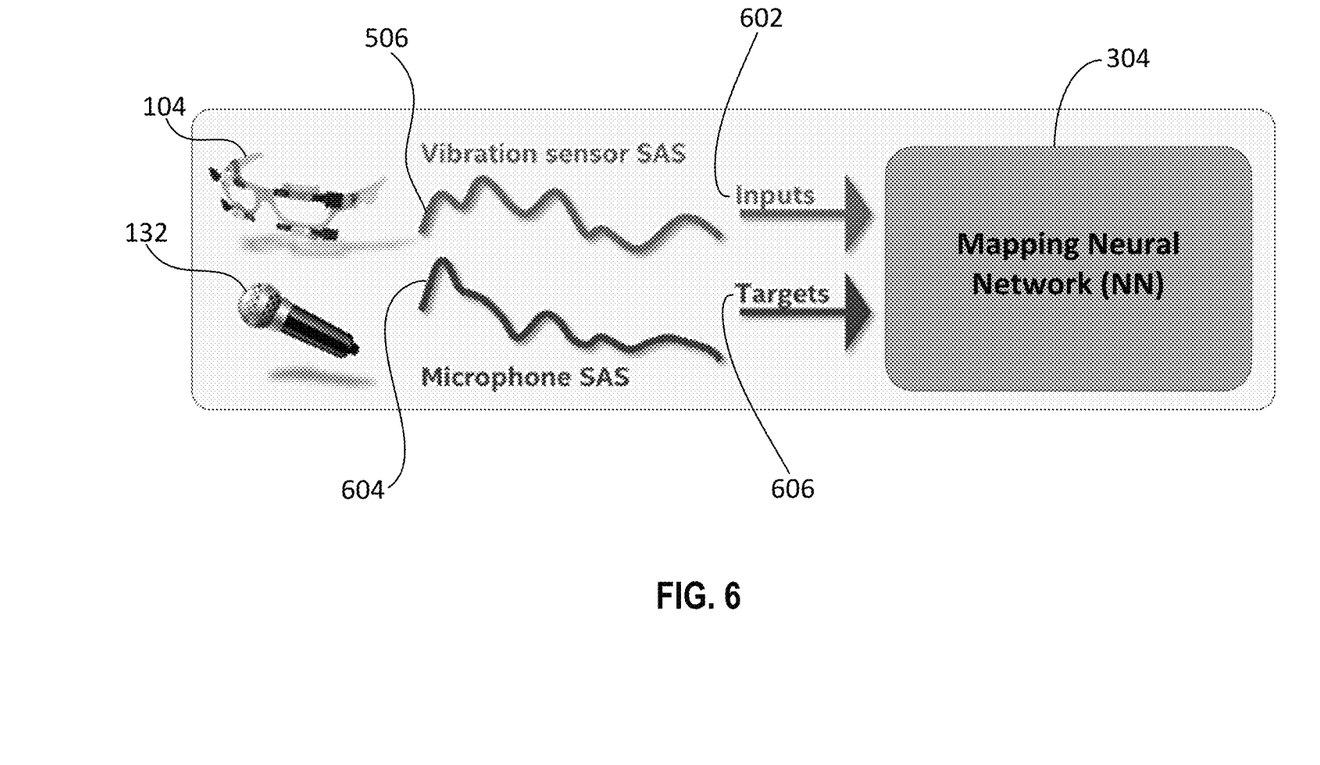
FIG. 6 illustrates the extracted audio components that are used to train a mapping neural network for transforming a signal from a vibration sensor into an approximation of a signal from a microphone, according to some embodiments.

Once the SAS 506 is obtained in operation 406, it may then be provided to mapping neural network 304 in operation 412. The mapping neural network 304 may be configured, via a training process, to map and/or convert SAS 506 into a transformed SAS that approximates an SAS that would be obtained if the audio signal had come from a microphone sensor 132. A training process that may be implemented in embodiments is depicted in FIG. 6. A source signal, such as a phrase or sound, may be captured simultaneously from vibration sensor 104 and microphone sensor 132, to yield two signals. Signal 130 from vibration sensor 104 and the corresponding signal from microphone sensor 132 may each be processed into their respective SASs 506 and 604 using the process described above with respect to FIG. 5. SAS 506 may be provided to an input channel 602 on mapping neural network 304, and the corresponding SAS 604 may be provided to a target channel 606 on mapping neural network 304. The mapping neural network may then use AI techniques to compare the two corresponding SASs and generate a mapping function for various signal components between each SAS. As the mapping neural network 304 is trained with increasing numbers of sounds and phrases, it may continue to improve its mapping capabilities. Following training, in run time the mapping neural network 304 may utilize its mapping function developed during training to transform a given SAS 506 into a tSAS that approximates the SAS that would result if SAS 506 were obtained from a microphone sensor signal. It will be recognized that the accuracy of the tSAS relative to an SAS from an actual microphone may depend upon the extent and type of training provided to the mapping neural network 304.

Mapping neural network 304 may be trained off-line, in a separate session, or, in other embodiments, may happen in real-time when an apparatus 100 is equipped with both a vibration sensor 104 and a microphone sensor 132, such as when a clean signal may be obtained from both sensors 104 and 132. Training phrases and patterns, especially when training is conducted in a discrete session, may be selected based upon the intended user or users of apparatus 300, as well as the intended use of the transformed voice signal from operation 418. For example, where the signal is to be used for human to human communications, e.g. phone calls or voice chats, it may be less critical that the transformed signal closely approximate a microphone signal, as a human listener may be able to easily determine what is being said despite some residual nasal distortion. Conversely, where the transformed signal is to be provided to an ASR routine, a well-trained mapping neural network 304 that yields a close approximation to a microphone signal may be desirable to obtain an acceptably low WER from the ASR routine.

As described above with reference to FIG. 4, following obtaining a tSAS from a trained mapping neural network 304, the signal may be reconstructed from the tSAS in operation 416, by adding back in the deviation data 510 and, if available or retained, phase data, and then performing an inverse FFT/DFT. Adding back in the deviation data may improve WER rates on ASR routines, as it may prevent the audio from sounding too "robotic" or machine-derived. The result, in operation 418, is an audio signal similar to signal 130, but more closely approximating a signal obtained from a microphone sensor 132. Adding in the deviation data from the vibration sensor may help recreate natural inflections in the approximated signal.

Figure 7:
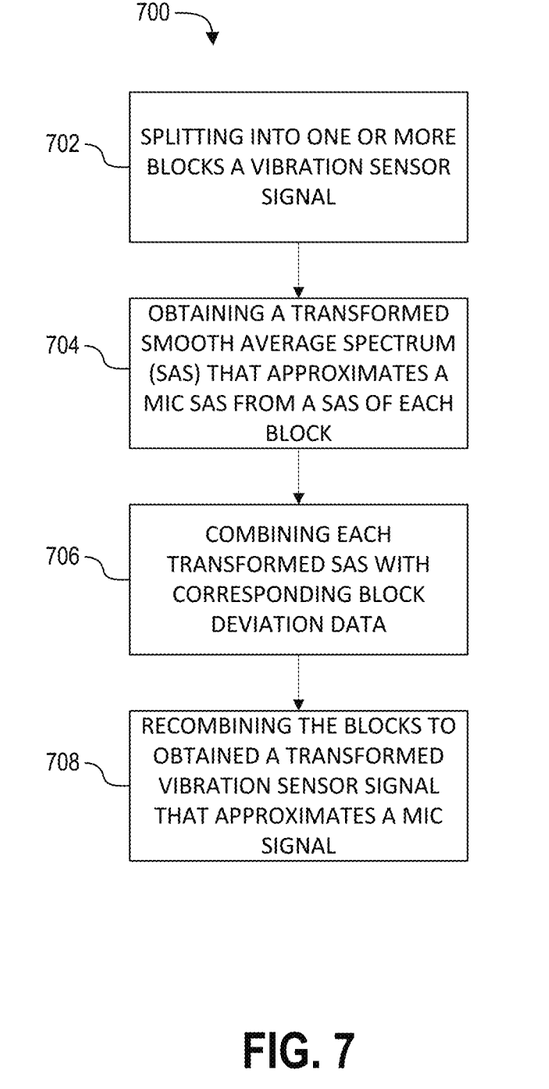
FIG. 7 illustrates the operations of a method for transforming a signal from a vibration sensor into an approximation of a signal from a microphone that may be performed by the apparatus of FIG. 3, according to some embodiments.

Turning to FIG. 7, an example method 700 for obtaining a transformed signal from a vibration sensor that approximates a signal from a microphone is illustrated. Method 700 may be implemented in whole or in part by apparatus 300. Method 700 starts with block 702, where a signal from a vibration sensor 104 may be split into one or more blocks, as described above. In block 704, a transformed smooth average spectrum may be obtained for each block that approximates a smooth average spectrum that would be obtained from a microphone for the same signal, such as with a mapping neural network 304 as described above with reference to FIG. 4. In block 706, each transformed SAS may be combined with corresponding deviation data, and in block 708, the blocks from block 702 may be recombined to obtain a transformed vibration sensor signal that approximates a microphone signal of the same source.

The present disclosure is described with reference to flow chart illustrations and/or block diagrams of methods, apparatus (systems) and computer program products according to embodiments of the disclosure. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow chart and/or block diagram block or blocks.

The computer program instructions may also be loaded onto a computer or other programmable data processing apparatus to cause a series of operational operations to be performed on the computer or other programmable apparatus to produce a computer implemented process such that the instructions which execute on the computer or other programmable apparatus provide processes for implementing the functions/acts specified in the flow chart and/or block diagram block or blocks.

EXAMPLES

The following examples pertain to further embodiments.

Example 1 is an apparatus, comprising a mapping neural network to transform a smooth average spectrum of a signal captured with a vibration sensor into a transformed smooth average spectrum that approximates the smooth average spectrum that would be obtained if the signal were captured with a microphone, and a signal processor to split, into one or more blocks, the signal captured with a vibration sensor, derive a smooth average spectrum and corresponding deviation data from each block, pass each block's smooth average spectrum through the mapping neural network to obtain a transformed smooth average spectrum for each block, combine each transformed smooth average spectrum with the block's corresponding deviation data, and recombine the blocks to obtain a transformed signal.

Example 2 may include the subject matter of example 1, or any other example herein, wherein the smooth average spectrum is to be derived using a discrete Fourier transformation to obtain a power spectrum of each block, and employing a model that models the power spectrum as a smooth average spectrum and a ripple deviation.

Example 3 may include the subject matter of example 1 or 2, or any other example herein, wherein the corresponding deviation data is to be derived by subtracting the smooth average spectrum from the power spectrum.

Example 4 may include the subject matter of any of examples 1-3, or any other example herein, wherein the smooth average spectrum is further to be derived by calculating the smooth average spectrum from the power spectrum using a moving average.

Example 5 may include the subject matter of any of examples 1-4, or any other example herein, wherein the transformed smooth average spectrum is to be obtained by passing each smooth average spectrum through a mapping function.

Example 6 may include the subject matter of any of examples 1-5, or any other example herein, wherein the mapping neural network is trained to transform each smooth average spectrum to the corresponding transformed smooth average spectrum by feeding it the smooth average spectrum and a corresponding smooth average spectrum obtained from a microphone signal.

Example 7 may include the subject matter of any of examples 1-6, or any other example herein, wherein the vibration sensor comprises a nasal bridge pickup of a smart glasses.

Example 8 may include the subject matter of any of examples 1-6, or any other example herein, wherein the vibration sensor comprises a vibration motor of a mobile device.

Example 9 is method, comprising splitting, into one or more blocks, a signal from a vibration sensor, obtaining a transformed smooth average spectrum for a smooth average spectrum of each block, wherein each transformed smooth average spectrum approximates what the corresponding smooth average spectrum would be if the signal were captured with a microphone, combining each transformed smooth average spectrum with corresponding deviation data of each block, and recombining the blocks to obtain a transformed signal, based at least in part on the results of the combination of the transformed smooth average spectrum and the corresponding deviation data.

Example 10 may include the subject matter of example 9, or any other example herein, further comprising deriving the smooth average spectrum and the corresponding deviation data for each block by using a discrete Fourier transformation to obtain a power spectrum of each block, and employing a model that models the power spectrum as a smooth average spectrum and a ripple deviation.

Example 11 may include the subject matter of example 9 or 10, or any other example herein, wherein deriving the corresponding deviation data comprises subtracting the smooth average spectrum from the power spectrum.

Example 12 may include the subject matter of any of examples 9-11, or any other example herein, wherein deriving the smooth average spectrum further comprises calculating the smooth average spectrum from the power spectrum using a moving average.

Example 13 may include the subject matter of any of examples 9-12, or any other example herein, wherein obtaining the transformed smooth average spectrum further comprises passing each smooth average spectrum through a mapping function.

Example 14 may include the subject matter of any of examples 9-13, or any other example herein, wherein obtaining the transformed smooth average spectrum further comprises passing each smooth average spectrum through a mapping neural network, wherein the mapping neural network is trained to transform each smooth average spectrum to the corresponding transformed smooth average spectrum by feeding it the smooth average spectrum and a corresponding smooth average spectrum obtained from a microphone signal.

Example 15 is a non-transitory computer-readable medium (CRM) comprising instructions that cause an apparatus, in response to execution by a processor of an apparatus, to split, into one or more blocks, a signal from a vibration sensor, obtain a transformed smooth average spectrum for a smooth average spectrum of each block, wherein each transformed smooth average spectrum approximates what the corresponding smooth average spectrum would be if the signal were captured with a microphone, combine each transformed smooth average spectrum with corresponding deviation data of each block, and recombine the blocks to obtain a transformed signal, based at least in part on the results of the combination of the transformed smooth average spectrum and the corresponding deviation data.

Example 16 may include the subject matter of example 15, or any other example herein, wherein the apparatus is further caused to derive the smooth average spectrum and the corresponding deviation data for each block; wherein to derive the smooth average spectrum comprises usage of a discrete Fourier transformation to obtain a power spectrum of each block, and employment of a model that models the power spectrum as a smooth average spectrum and a ripple deviation.

Example 17 may include the subject matter of example 15 or 16, or any other example herein, wherein to derive the corresponding deviation data comprises to subtract the smooth average spectrum from the power spectrum.

Example 18 may include the subject matter of any of examples 15-17, or any other example herein, wherein to derive the smooth average spectrum further comprises to calculate the smooth average spectrum from the power spectrum using a moving average.

Example 19 may include the subject matter of any of examples 15-18, or any other example herein, wherein to obtain the transformed smooth average spectrum comprises to pass each smooth average spectrum through a mapping function.

Example 20 may include the subject matter of any of examples 15-19, or any other example herein, wherein to obtain the transformed smooth average spectrum comprises to pass each smooth average spectrum through a mapping neural network; wherein the mapping neural network is trained to transform each smooth average spectrum to the corresponding transformed smooth average spectrum by feeding it the smooth average spectrum and a corresponding smooth average spectrum obtained from a microphone signal.

Example 21 is a system, comprising means for transforming a smooth average spectrum of a signal captured with a vibration sensor into a transformed smooth average spectrum that approximates the smooth average spectrum that would be obtained if the signal were captured with a microphone, and means for processing a signal, to split, into one or more blocks, the signal captured with a vibration sensor, derive a smooth average spectrum and corresponding deviation data from each block, pass each block's smooth average spectrum through the transforming means to obtain a transformed smooth average spectrum for each block, combine each transformed smooth average spectrum with the block's corresponding deviation data, and recombine the blocks to obtain a transformed signal.

Example 22 may include the subject matter of example 21, or any other example herein, wherein the means for processing is to derive the smooth average spectrum using a discrete Fourier transformation to obtain a power spectrum of each block, and is to employ a model that models the power spectrum as a smooth average spectrum and a ripple deviation.

Example 23 may include the subject matter of example 21 or 22, or any other example herein, wherein the means for processing is to derive the corresponding deviation data by subtracting the smooth average spectrum from the power spectrum.

Example 24 may include the subject matter of any of examples 21-23, or any other example herein, wherein the means for processing is to further derive the smooth average spectrum by calculating the smooth average spectrum from the power spectrum using a moving average.

Example 25 may include the subject matter of any of examples 21-24, or any other example herein, wherein the means for transforming is to obtain a transformed smooth average spectrum by passing each smooth average spectrum through a mapping function.

Example 26 may include the subject matter of any of examples 21-25, or any other example herein, wherein the means for transforming is to obtain the transformed smooth average spectrum by passing each smooth average spectrum through a mapping neural network; wherein the mapping neural network is trained to transform each smooth average spectrum to the corresponding transformed smooth average spectrum by feeding it the smooth average spectrum and a corresponding smooth average spectrum obtained from a microphone signal.

Example 27 may include the subject matter of any of examples 9-14, wherein the method is performed by a wearable device.

Example 28 may include the subject matter of any of examples 15-20, wherein the instructions are to be executed by a wearable device.

Example 29 may include the subject matter of any of examples 21-26, wherein system comprises a wearable device.

Example 30 may include the subject matter of any of examples 27-29, wherein the wearable device comprises a smart glasses.

Example 31 may include the subject matter of any of examples 1-8, wherein a portion or all of either or both of the mapping neural network and signal processor are implemented in hardware.

Example 32 may include the subject matter of any of examples 1-8, wherein a portion or all of either or both of the mapping neural network and signal processor are implemented in software.

Example 33 may include the subject matter of any of examples 9-30, or any other example herein, wherein the vibration sensor comprises a nasal bridge pickup of a smart glasses.

Example 34 may include the subject matter of any of examples 9-30, or any other example herein, wherein the vibration sensor comprises a vibration motor of a mobile device.

Example 35 may include the subject matter of any of examples 1-34, or any other example herein, wherein the mapping neural network is implemented as a feed-forward network.

Example 36 may include the subject matter of any of examples 1-35, or any other example herein, wherein the mapping neural network is implemented in a sigmoid configuration.

Example 37 may include the subject matter of any of examples 1-36, or any other example herein, wherein the mapping neural network comprises at least one layer further comprised of between 250-270 nodes.

Example 38 may include the subject matter of any of examples 1-37, or any other example herein, wherein the mapping neural network comprises an input layer of 257 nodes, two hidden layers of 270 nodes each, and an output layer of 257 nodes.

Example 39 may include the subject matter of example 38, or any other example herein, wherein the two hidden layers further comprise a rectified linear unit activation function.

Example 40 may include the subject matter of example 38 or 39, or any other example herein, wherein the output layer further comprises a linear activation function.

Example 41 may include the subject matter of any of examples 1-40, or any other example herein, wherein the vibration sensor signal is sampled to a plurality of samples, and each block is comprised of 512 samples.

Example 42 may include the subject matter of any of examples 1-41, or any other example herein, wherein each block overlaps with a previous and/or a subsequent block.

Example 43 may include the subject matter of example 42, or any other example herein, wherein each block overlaps the previous and/or subsequent block by 75%.

What is claimed is:

1. An apparatus, comprising:
a mapping neural network to transform a smooth average spectrum of a block of a signal captured with a vibration sensor into a transformed smooth average spectrum of the block that approximates what the smooth average spectrum of the block would be if the signal were captured with a microphone; and
a signal processor to:
split, into a plurality of blocks, the signal captured with the vibration sensor;
derive the smooth average spectrum and corresponding deviation data for each of the plurality of blocks;
pass each block's smooth average spectrum through the mapping neural network to obtain a corresponding transformed smooth average spectrum for each block;
combine the transformed smooth average spectrum of each block with each block's corresponding derived deviation data; and
recombine the transformed smooth average spectrums of the plurality of blocks, having the blocks' corresponding derived deviation data correspondingly combined, to obtain a transformed signal for the signal captured with the vibration sensor, wherein the transformed signal approximates what the signal would be if the signal were captured with a microphone.

2. The apparatus of claim 1, wherein the smooth average spectrum of each of the plurality of blocks is to be derived using a discrete Fourier transformation to obtain a power spectrum of the block, and followed with employment of a model to models the power spectrum of each block as a smooth average spectrum and a ripple deviation of each block.

3. The apparatus of claim 2, wherein the corresponding deviation data of each block is to be derived by subtracting the smooth average spectrum of each block from the power spectrum of each block.

4. The apparatus of claim 2, wherein the smooth average spectrum of each block is further to be derived by calculating the smooth average spectrum of each block from the power spectrum of each block, using a moving average.

5. The apparatus of claim 1, wherein the vibration sensor comprises a nasal bridge pickup of a smart glasses.

6. The apparatus of claim 1, wherein the mapping neural network is trained to transform the smooth average spectrum of each block to the corresponding transformed smooth average spectrum of each block by feeding the mapping neural network with smooth average spectrums of a plurality of training blocks of one or more training signals obtained from one or more training vibration sensors, and corresponding smooth average spectrums of a corresponding plurality of training blocks of one or more corresponding training signals obtained from one or more microphones.

7. The apparatus of claim 1, wherein the vibration sensor comprises a vibration motor of a mobile device.

8. A method, comprising:
splitting, into a plurality of blocks, a signal from a vibration sensor;
obtaining a transformed smooth average spectrum for a smooth average spectrum of each of the plurality of blocks, wherein the transformed smooth average spectrum of each block approximates what a corresponding smooth average spectrum of each block would be if the signal were from with a microphone;
combining the transformed smooth average spectrum of each block with corresponding deviation data of the block; and
recombining the transformed smooth average spectrums of the plurality of blocks having the blocks' corresponding deviation data correspondingly combined, to obtain a transformed signal for the signal from the vibration sensor, wherein the transformed signal approximates what the signal would be if the signal were from the microphone.

9. The method of claim 8, wherein obtaining the transformed smooth average spectrum of each of the plurality of blocks further comprises passing the smooth average spectrum of each block through a mapping neural network, wherein the mapping neural network is trained to transform the smooth average spectrum of each block to the corresponding transformed smooth average spectrum of each block, by feeding the mapping neural network with smooth average spectrums of a plurality of training blocks of one or more training signals obtained from one or more training vibration sensors, and corresponding smooth average spectrums of a corresponding plurality of training blocks of one or more corresponding training signals obtained from one or more microphones.

10. The method of claim 8, further comprising deriving the smooth average spectrum and the corresponding deviation data for each of the plurality of blocks by using a discrete Fourier transformation to obtain a power spectrum of each block, and employing a model to models the power spectrum of each block as a smooth average spectrum and a ripple deviation of each block.

11. The method of claim 10, wherein deriving the corresponding deviation data of each of the plurality of blocks comprises subtracting the smooth average spectrum of each block from the power spectrum of each block.

12. The method of claim 10, wherein deriving the smooth average spectrum of each of the plurality of blocks further comprises calculating the smooth average spectrum of each block from the power spectrum of each block, using a moving average.

13. The method of claim 8, wherein obtaining the transformed smooth average spectrum of each of the plurality of blocks further comprises passing the smooth average spectrum of each block through a mapping function.

14. A non-transitory computer-readable medium (CRM) comprising instructions that cause an apparatus, in response to execution by a processor of the apparatus, to:
split, into a plurality of blocks, a signal from a vibration sensor;
obtain a transformed smooth average spectrum for a smooth average spectrum of each of the plurality of blocks, wherein the transformed smooth average spectrum of each block approximates what a corresponding smooth average spectrum of each block would be if the signal were from with a microphone;
combine the transformed smooth average spectrum of each block with corresponding deviation data of each block; and
recombine the transformed smooth average spectrums of the plurality of blocks, having the blocks' corresponding derived deviation data correspondingly combined, to obtain a transformed signal for the signal from the vibration sensor, wherein the transformed signal approximates what the signal would be if the signal were from the microphone.

15. The CRM of claim 14, wherein to obtain the transformed smooth average spectrum of each of the plurality of blocks comprises to pass the smooth average spectrum of each block through a mapping neural network; wherein the mapping neural network is trained to transform the smooth average spectrum each block to a corresponding transformed smooth average spectrum of each block, by feeding the mapping neural network with smooth average spectrums of a plurality of training blocks of one or more training signals obtained from one or more training vibration sensors and corresponding smooth average spectrums of a corresponding plurality of training blocks of one or more corresponding training signals obtained from one or more microphones.

16. The CRM of claim 14, wherein the apparatus is further caused to derive the smooth average spectrum and the corresponding deviation data for each of the plurality of blocks; wherein to derive the smooth average spectrum of each block comprises usage of a discrete Fourier transformation to obtain a power spectrum of each block, and employment of a model to model the power spectrum of each block as a smooth average spectrum and a ripple deviation of each block.

17. The CRM of claim 16, wherein to derive the corresponding deviation data of each of the plurality of blocks comprises to subtract the smooth average spectrum of each block from the power spectrum of each block.

18. The CRM of claim 16, wherein to derive the smooth average spectrum of each of the plurality of blocks further comprises to calculate the smooth average spectrum of each block from the power spectrum of each block using a moving average.

19. The CRM of claim 14, wherein to obtain the transformed smooth average spectrum of each of the plurality of blocks comprises to pass the smooth average spectrum of each block through a mapping function.

* * * * *

UNITED STATES PATENT AND TRADEMARK OFFICE
CERTIFICATE OF CORRECTION

PATENT NO. : 10,811,033 B2
APPLICATION NO. : 16/017501
DATED : October 20, 2020
INVENTOR(S) : Cordourier Maruri et al.

It is certified that error appears in the above-identified patent and that said Letters Patent is hereby corrected as shown below:

In the Claims

Column 16
Line 15, "model to models..." should read – "model to model..."

Column 17
Line 10, "...a model to models..." should read – "...a model to model..."

Signed and Sealed this
Twenty-second Day of December, 2020

Andrei Iancu
*Director of the United States Patent and Trademark Office*